(12) United States Patent
Quine et al.

(10) Patent No.: US 7,596,600 B2
(45) Date of Patent: Sep. 29, 2009

(54) SYSTEM FOR SELECTIVE DELIVERY OF ELECTRONIC COMMUNICATIONS

(76) Inventors: Douglas B. Quine, 59 Taylor Rd., Bethel, CT (US) 06801; Richard D Blue, 3 Roosevelt Ave., Old Greenwich, CT (US) 06870

(*) Notice: Subject to any disclaimer, the term of this patent is extended or adjusted under 35 U.S.C. 154(b) by 799 days.

(21) Appl. No.: 10/222,340

(22) Filed: Aug. 15, 2002

(65) Prior Publication Data
US 2003/0187942 A1    Oct. 2, 2003

Related U.S. Application Data

(60) Provisional application No. 60/368,922, filed on Mar. 28, 2002.

(51) Int. Cl.
*G06F 15/16* (2006.01)
(52) U.S. Cl. .................. 709/206; 709/207
(58) Field of Classification Search .......... None
See application file for complete search history.

(56) References Cited

U.S. PATENT DOCUMENTS

| | | | | |
|---|---|---|---|---|
| 5,619,648 A * | 4/1997 | Canale et al. | ............... | 709/206 |
| 5,835,722 A * | 11/1998 | Bradshaw et al. | ........... | 709/225 |
| 5,930,479 A * | 7/1999 | Hall | ............................ | 709/238 |
| 5,937,161 A * | 8/1999 | Mulligan et al. | ............. | 709/206 |
| 5,987,508 A * | 11/1999 | Agraharam et al. | ......... | 709/217 |
| 5,999,932 A * | 12/1999 | Paul | ............................ | 707/10 |
| 5,999,967 A * | 12/1999 | Sundsted | .................... | 709/206 |
| 6,018,762 A * | 1/2000 | Brunson et al. | ............. | 709/206 |
| 6,023,723 A * | 2/2000 | McCormick et al. | ........ | 709/206 |
| 6,052,709 A * | 4/2000 | Paul | ............................ | 709/202 |
| 6,055,302 A | 4/2000 | Schmersel et al. | ........... | 379/207 |
| 6,108,420 A * | 8/2000 | Larose et al. | ................. | 705/59 |
| 6,112,227 A * | 8/2000 | Heiner | ....................... | 709/203 |
| 6,118,856 A | 9/2000 | Paarsmarkt et al. | ...... | 379/93.24 |
| 6,128,739 A | 10/2000 | Fleming | ..................... | 713/200 |
| 6,212,265 B1 | 4/2001 | Duphorne | ................... | 379/142 |
| 6,249,807 B1 | 6/2001 | Shaw et al. | ................. | 709/206 |
| 6,282,565 B1 | 8/2001 | Shaw et al. | ................. | 709/206 |
| 6,321,267 B1 | 11/2001 | Donaldson | .................. | 709/229 |
| 6,324,569 B1 | 11/2001 | Ogilvie et al. | ............. | 709/206 |
| 6,389,455 B1 * | 5/2002 | Fuisz | ......................... | 709/206 |
| 6,427,164 B1 | 7/2002 | Reilly | | |
| 6,438,583 B1 * | 8/2002 | McDowell et al. | .......... | 709/206 |
| 6,654,779 B1 * | 11/2003 | Tsuei | ......................... | 718/101 |
| 6,654,789 B1 | 11/2003 | Bliss et al. | | |
| 7,020,650 B2 * | 3/2006 | Sato et al. | ...................... | 707/6 |
| 2002/0065891 A1 * | 5/2002 | Malik | ......................... | 709/206 |

OTHER PUBLICATIONS

DeLoria, Wayne C. and Bettis, Linda J. "DMS Service Management," Nov. 1995, IEEE, vol. 3, pp. 967-971.*
Klensin; "RFC 2821: Simple Mail Transfer Protocol," Apr. 2001, http://tools.ietf.org/html/rfc2821.*
Two (2) webpages from www.switchemail.com website printed Nov. 1, 2002.

* cited by examiner

*Primary Examiner*—Vivek Srivastava
*Assistant Examiner*—Azizul Choudhury
(74) *Attorney, Agent, or Firm*—Schwabe, Williamson & Wyatt, P.C.

(57) ABSTRACT

The present invention relates to an apparatus and method for selective delivery of electronic communications to reduce the amount of unwanted email (spam) that is received. An electronic message is not delivered to a recipient until the sender address is verified. If the address is not verified, it can be compared to a database that includes known spammers. Also, records of spamming and forged emails can be compiled and forwarded to an enforcement agency.

18 Claims, 4 Drawing Sheets

SYSTEM FOR SELECTIVE DELIVERY OF ELECTRONIC COMMUNICATIONS

This application claims priority to U.S. Provisional Patent Application Ser. No. 60/368,922, filed Mar. 28, 2002, entitled, "System and Method for Electronic Data Transfer".

BACKGROUND

1. Field of the Invention

The present invention relates generally to selective delivery of electronic communications, particularly preventing delivery of unwanted electronic communications, such as SPAM sent from a sender to a recipient. More particularly, the present invention relates to verifying a sender's address and/or electronic routing headers and delivering only those communications that are transmitted from an authentic source. A third party may accumulate information relating to a request from a recipient to unsubscribe from a source or type of electronic communications. The third party may use the accumulated information to take corrective action against senders who abuse requests of a recipient to unsubscribe.

2. Brief Description of the Art

The high cost of "Direct Mail" ($500 to $700 per 1,000 messages) compared to the relatively low cost of electronic mail (email) ($5 to $7 per 1,000 messages) as well as the faster turn-around time for email messages causes many solicitors to transmit unwanted and/or undesired emails to recipients. This unwanted and unsolicited email is a major problem for users of electronic mail systems and the Internet. Since the incremental cost of sending email messages is essentially zero to the sender, there is no incentive to temper distribution of information via email and/or the Internet. The recipient of these unwanted and unsolicited communications (spam) has no viable means to segregate or prevent the spam. (The term "spamming" is believed to have originated in a Monty Python comedy skit in which a waitress repeatedly offers a customer Spam, even though the customer repeatedly says that he does not want the canned meat product. In electronic transmissions, spamming relates to sending unsolicited email for commercial purposes over the Internet.)

Spam has become an arms race—as users learn to identify the unwanted email (e.g. message from junk.com), the mailers change their approach. It is often necessary for users to read every email message to determine which ones were unwanted as the mailers become more sophisticated in their selection of user name and message subject titles. Ultimately the burden becomes so severe that people must close their existing email accounts and move to a new account name that is not yet know to the spammers—and the pattern repeats. The users suffer because their legitimate correspondents are often the last to learn their new address.

While over a dozen states have passed laws against spam, there is no effective enforcement or practical way to control spam since the senders typically hide themselves and cannot be prosecuted. For many email users, the only solution to stop such spam is to close their email account and open a different account.

Many electronic communications, such as email messages, provide recipients with an option to unsubscribe to the communications (typically by providing text in the email and on webpages that instructs a recipient to "click" on an area to unsubscribe). This type of unsubscribe feature has at least two major drawbacks. The first drawback is that the recipient must read the message in some degree of detail to identify whether the communication has such an unsubscribe feature and then to access the feature. A second drawback is that a request to be removed from an electronic mailing list often backfires since it provides an indication that the electronic communication was actually read and that the recipient's email account is active. Thus, upon receipt of such requests, unscrupulous senders often increase the spam attacks rather than removing the recipient's name from an electronic mailing list. Furthermore, the very concept of "unsubscribe" is predicated upon the assumption that the user has previously "subscribed" to that mailing.

Conventional spam blocking approaches, such as blocking undesired addresses (user name level or domain level) are ineffective since many spammers change their mailing domain name as often as every few minutes (junk.com becomes fun.com next time, thus blocking junk.com does not solve the spam problem.)

Other conventional approaches, such as blocking undesired addresses and blocking undesired subjects, are offered by AOL, Hotmail, Yahoo, Eudora, and email filtering software. However, these systems are known to pass tremendous amounts of undesired spam and also to block desired mail. Furthermore, these systems are extremely susceptible to falsification by senders placing false information in the subject line and by using different words than those in the body of the message (e.g. use of synonyms for offensive words and the use of graphics).

What is needed to overcome drawbacks in the state of the art is a method and apparatus that permits recipients to receive desired electronic communications and block undesired electronic communications without reading the communication to determine that it is junk email, spam or other unwanted email. Recipients also need recourse against spammers.

BRIEF SUMMARY OF THE INVENTION

The instant invention provides a solution to the above-noted problems by providing a method and apparatus that selectively delivers email messages to recipients. The selection feature is based on a determination that the senders have not misrepresented themselves. Another feature of the invention is that the recipient's request to unsubscribe may be recorded and the proper enforcement authority notified if the sender misrepresents themselves or if the recipient is sent unwanted email from the same sender despite an unsubscribe request.

Accordingly, one embodiment of the present invention is directed to an apparatus and method for selective delivery of electronic communications. The method includes receiving a communication that is sent from a sender. The communication is parsed to determine a sender address associated with the communication. The sender address format is checked and if the sender address format is not valid, then the communication from the sender may be deleted. If the sender address format is valid, then a determination is made of the validity of the trace data (or routing data) associated with the e-mail message. If the trace data is valid, then the communication is delivered to a recipient electronic address. If the trace data is suspect, then a request is transmitted to the sender electronic address to authenticate the origin of the communication. The communication is stored electronically until a response to the authentication request is received from the sender electronic address. If an affirmative response to the request to authenticate is received from the sender electronic address, then the communication is delivered to the recipient electronic address. If the request to authenticate is returned from the sender electronic address as undeliverable, then an indication that the sender electronic address is undeliverable is stored.

A second embodiment of the present invention is directed to an apparatus and method for selective delivery of electronic communications. This includes receiving a communication and parsing the communication. Next, a determination is made regarding a sender address associated with communication. The sender address is evaluated and if the sender address is not valid, then the communication is deleted. If the sender address is valid, then the communication is transmitted to a recipient electronic address.

Another embodiment of the present invention is directed to an apparatus and method for selective delivery of electronic communications. This includes receiving a communication and parsing the communication. Next, a sender address associated with the communication is identified, evaluated and a determination is made regarding the validity of the trace data within the communication. If the trace data is valid, then the communication is delivered to a recipient electronic address. If the trace data is not valid, then a request is transmitted to the sender to confirm that the communication originated from the sender.

Yet another embodiment of the present invention is directed to an apparatus and method for selective delivery to a recipient address of electronic communications. This includes receiving a communication from a sender electronic address and parsing the communication. The next step is determining whether the communication is authenticated by a digital certificate. If there is not a digital certificate, then a message is transmitted to the sender that only digitally certified communications are accepted by the recipient address. If there is a digital certificate, then communication is delivered to the recipient electronic address.

Yet another embodiment of the present invention is directed to an apparatus and method for selective delivery of electronic communications. This includes receiving a communication from a sender electronic address and parsing the communication. Next, determining whether a portion, for example, subject phrases, of the sender electronic address include undesired information. A request is transmitted to the sender electronic address to authenticate an origin of the communication when a portion of the sender electronic address includes undesired information. The communication is stored electronically until a response to the request to authenticate is received from the sender electronic address. The communication may be delivered with a warning flag. Also, if an affirmative response to the request is received from the sender, then the communication may be delivered to the recipient. If the request is returned from the sender as undeliverable, then an indication, or flag signal is stored that indicates that the sender electronic address is undeliverable.

Yet another embodiment of the present invention is directed to an apparatus and method that enables a user to identify incoming messages and determine an original source initiator based on a user-modified email address. This enables a user to link a transaction origination address to a reply communication. First, a range of electronic addresses is allocated to a particular user (prospective recipient). A unique recipient electronic address is assigned by the recipient, or the application software, when the prospective recipient is initiating electronic communication with a sender address. The recipient, or the application software, maintains a list of associations between assigned unique recipient electronic addresses and communications. The assigned unique recipient electronic address is used when transmitting communications from the recipient. When the recipient receives return communications, each return communication will be addressed to one of the unique recipient electronic addresses. The recipient, or application software, can identify the original address source based on the unique recipient email address. Authorities can be alerted when the e-mail address is misused or provided to third parties without the recipient's authorization.

Yet another embodiment of the present invention is directed to an apparatus and method for identifying misrepresentations or fraud within an electronic communication. This includes comparing a first element or portion of the electronic communication, such as hyperlink text (e.g. "AOL billing Site") with a second element or portion of the electronic communication such as hyperlink URL (Uniform Resource Locator) e.g. "http://www.creditcardthief.com" data or sender address data. A comparison is made between the first element of the electronic communication and the second element of the electronic communication. An alert condition is established when the first element and the second element do not correspond.

Yet another embodiment of the present invention is directed to an apparatus and method for accumulating data relating to an unsubscribe request from a recipient of unwanted electronic communications. This includes receiving an undesired electronic communication from a sender. A first unsubscribe electronic communication is transmitted from the recipient to a third party electronic address, such as an enforcement authority. The third party then transmits a second unsubscribe electronic communication to the sender electronic address. The third party may accumulate unsubscribe data.

In this respect it is to be understood that the invention as described herein is not limited in its application to the details of construction and to the arrangements of the components set forth in the following description or illustrated in the drawings. Methods and apparatus consistent with the present invention are capable of other embodiments and of being practiced and carried out in various ways. Also, it is to be understood that the phraseology and terminology employed herein, are for the purpose of description and should not be regarded as limiting.

DETAILED DESCRIPTION OF THE INVENTION

Methods and apparatus consistent with the present invention relate to preventing the delivery of unwanted and undesired email or electronic communications (such communications are also known as spam) from a sender to a recipient. The spam can be blocked at a location remote from the recipient or at a firewall or filter or electronic dam that is resident at the recipient's electronic address, at the mail server, at the Internet Service Provider (ISP), or other location.

Since using false email addresses is one way that senders of unwanted email (spammers) circumvent blockage of spam, the present invention enables users to permit email to be delivered only if the sender has responded to a confirmation request from the user or a request made from another intermediate address. This invention removes the spammer's advantage, which is to change their address continuously to prevent recognition and blockage, while facilitating communication by legitimate correspondents to the address of an email recipient.

One embodiment of the invention relates to forwarding email from an old email account, which has been abandoned, to a new email account, which has been activated. The invention requires the sender to grant permission to forward the message to a new email address when the recipient user changes accounts, such as for example, changing Internet Service Providers (ISPs). Since these senders are forging their return addresses, there is no address to receive the request and therefore the message is not forwarded to the recipient's new email address. Only "legitimate" mailers have their mail forwarded to the recipient at the new account.

One technique that spammers use to disseminate spam is to change their mailing domain name as often as every 10 minutes (junk.com becomes fun.com next time, thus blocking junk.com does not solve the spam problem.)

One embodiment of the present invention prevents delivery of unwanted email by requiring that the sender respond to a confirmation request sent from the recipient or other third party. If the sender does not respond, various delivery alternatives are implemented based on specified factors.

Figure 1:
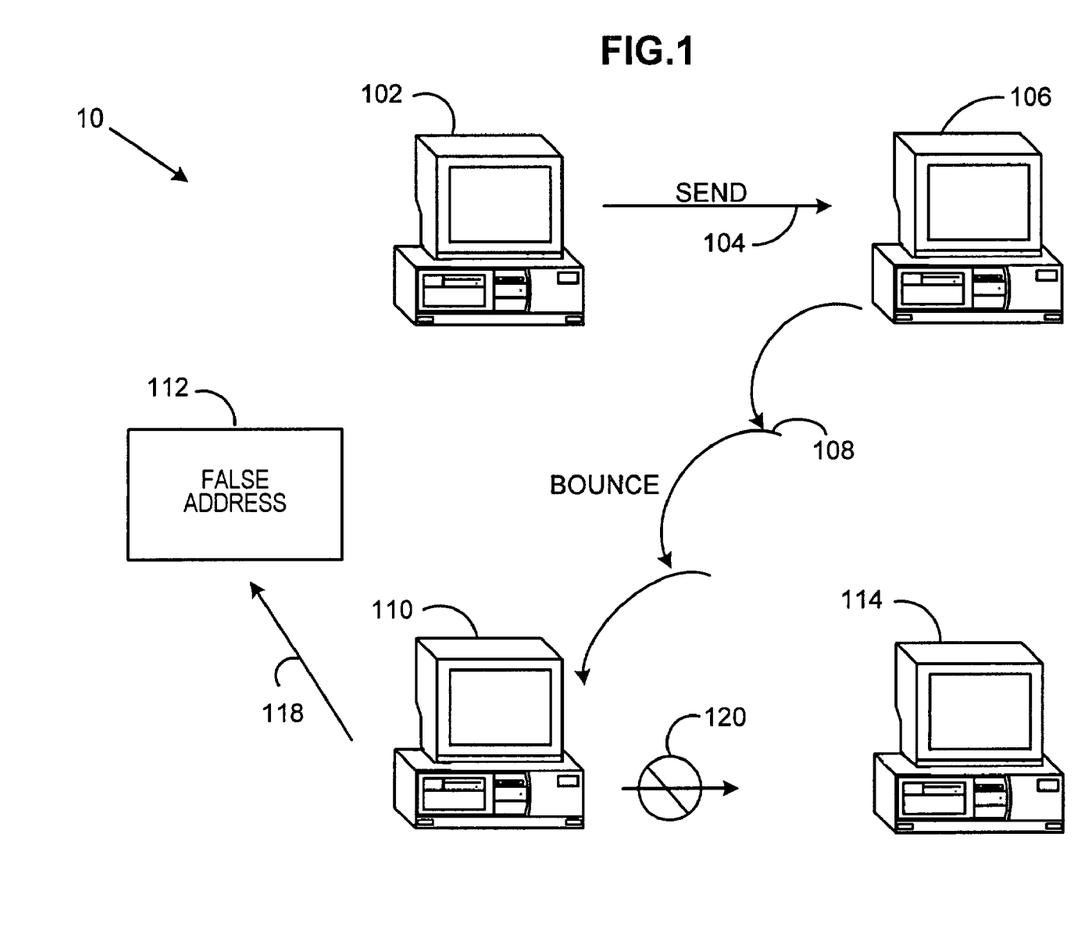
FIG. 1 shows a block diagram of system components used to prevent unwanted email messages from being delivered to a recipient.

FIG. 1 shows an embodiment of the invention in which a recipient has changed their email address from an old address, which is not active, to a new address, which is active.

As shown in FIG. 1, system 10 includes a spammer electronic address, shown as an Internet capable device (Internet capable device is typically for example, a computer workstation, a laptop computer, a hand-held personal digital assistant (pda) or any other device that can transmit and/or receive data over a network) 102 that transmits spam to a first recipient electronic address, shown as an Internet capable device 106 via line 104. Since the first recipient electronic address 106 is not active, the spam is transmitted to a second electronic address, shown as an Internet capable device 110, via line 108. The line 108 indicates that the communication could not reach the first recipient address and the communication is "bounced" to second electronic address 110.

The second electronic address 110 is an intermediate address that parses the bounced email message to ascertain sender address data. The intermediate address 110 has sufficient memory to store the necessary data to perform the functions. The intermediate address 110 also has sufficient speed to transmit electronic messages via a network, such as the Internet. The intermediate address 110 transmits an authentication request 118 to an address 112, which may be a false address that is not the address of sender location 102. If a response is not received from address 112, the second electronic address 110 can perform a variety of different actions. One action is to delete the communication and not forward it to an active account 114, as shown by blocking line 120. As will be described herein the request for authentication can be made without having the communication bounce from an inactive account; but rather by the intermediate address receiving all electronic data addressed to a recipient.

Figure 2A:
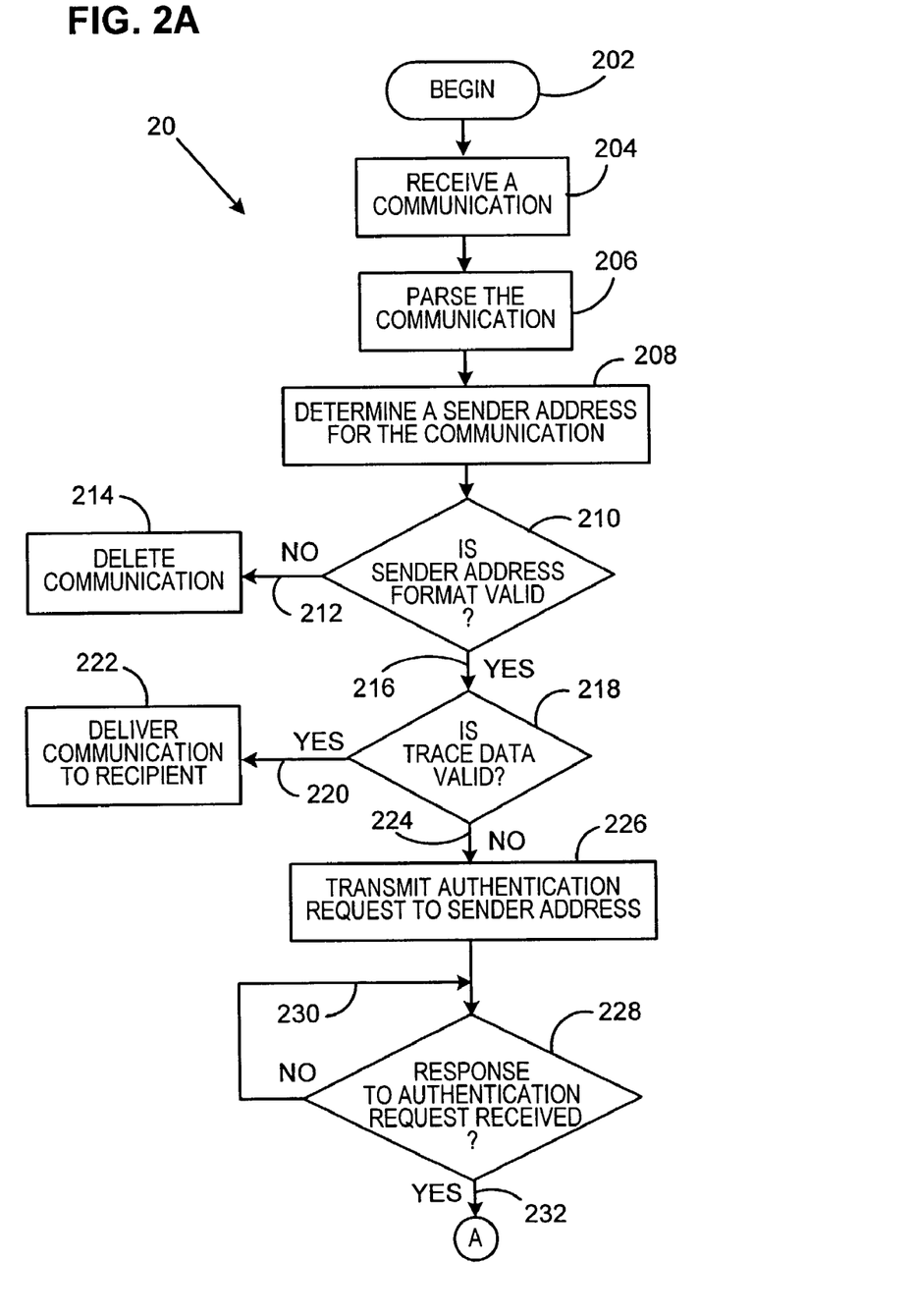
FIGS. 2A and 2B show a flowchart of steps to determine if an email message is valid.

As shown in FIG. 2, steps 20, which are suitably stored on a computer-readable medium, implement one embodiment of the present invention. Block 202 is a start block. Block 204 shows that a communication is received, by an intermediate address that may be co-located with the recipient or remotely located from the recipient. This communication is parsed, as shown in block 206. Block 208 shows that a determination is made regarding the sender's address. For example, the sender's address can be identified from the communication that was received. Decision block 210 examines the sender's address format to ascertain whether the format is valid. If the address format is not valid, then line 212 leads to block 214 that show the communication is deleted.

If the sender address format is valid, line 216 leads to block 218 that determines if the trace data is valid. The trace data is data that indicates the various recipients and senders of the communication. If the trace data is valid, line 220 leads to block 222 that shows the communication is delivered to a recipient electronic address.

If the trace data is not valid, line 224 leads to block 226 that shows a request is transmitted to the sender electronic address to authenticate an origin of the communication.

Block 228 and line 230 show that until a response to the request to authenticate is received from the sender electronic address, the communication is stored in memory.

Figure 2B:
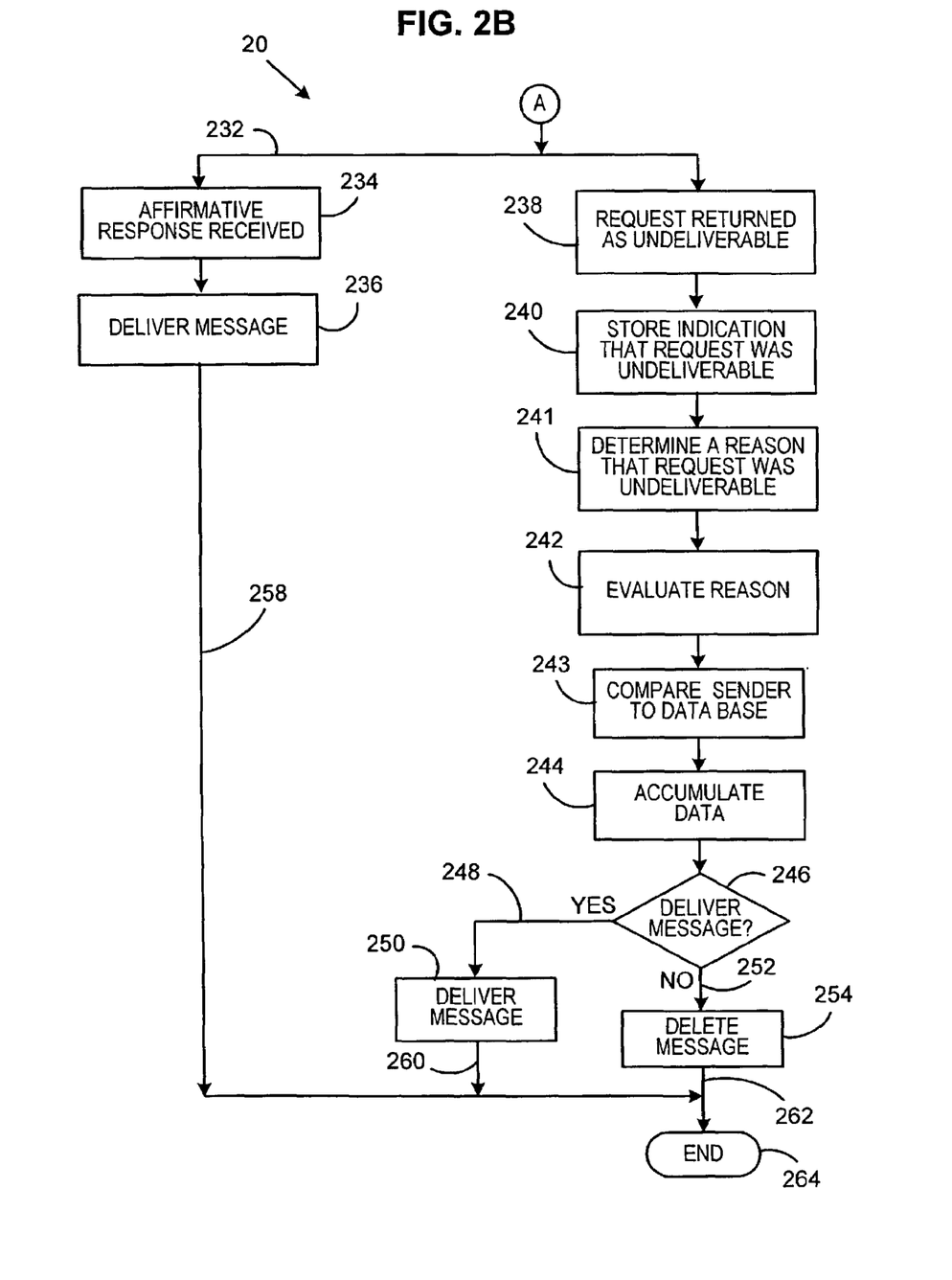

Line 232 and block 234 show that when an affirmative response to the request to authenticate is received from the sender electronic address, then the communication is delivered to the recipient electronic address, as shown by block 236. Line 258 leads to end block 264.

Line 232 also leads to block 238 that shows that the request to authenticate may be returned from the sender electronic address as undeliverable. Block 240 shows that an indication that the sender electronic address is undeliverable may be stored in memory.

Block 241 shows that a reason that the request to authenticate was undeliverable can be determined. Block 242 shows the reason may be evaluated. Block 243 shows that the sender address can be compared to a database that includes a list of known spammer addresses. If the address matches, then the message can be deleted or sent to the proper enforcement authorities for further action. Block 244 shows that the sender's address and the content of the electronic message may be accumulated and transmitted to the proper authorities.

Block 242 shows that the reason for the undeliverable response from the sender address can be evaluated. For example, if the request to authenticate was undeliverable due to an error, lack of disk space, server malfunction or network malfunction, it may very well be that the sender is a legitimate entity and not a spammer. If the reason for the undeliverable request is acceptable, the recipient will receive the communication. However, if the reason for the undeliverable request is that the sender address no longer exists, it may be that in that instance, the sender was attempting to transmit spam.

Decision block 246 shows that a decision is made whether or not to deliver the communication to the recipient. Line 248 leads to block 250 that delivers the communication to the recipient. Line 252 leads to block 254, which deletes the communication. Lines 260 and 262 lead to end block 264.

It is also an embodiment of the present invention that a notification may be sent to the recipient indicating that the request to authenticate has been returned from the sender electronic address as undeliverable.

It is also an embodiment of the present invention to provide the recipient with an opportunity to request delivery or request deletion of the communication.

It is also an embodiment of the present invention that a default time interval is established, after which unresponsive requests to the sender results in corrective action, such as inquiring whether the intended recipient wished to obtain the communication.

Another embodiment of the present invention is one in which the sender address is validated prior to delivering the communication to a recipient. In this embodiment a communication is received and parsed. A sender address is established based on the communication. After the sender address has been established, it is validated by comparing the address to standard Internet specifications for addresses. For example, the Internet address should include a valid name and a valid domain name, each of which comprises certain acceptable characters. If the sender address is not valid, then the communication is deleted. If the sender address is valid, then the communication is transmitted to a recipient electronic address.

Figure 3:
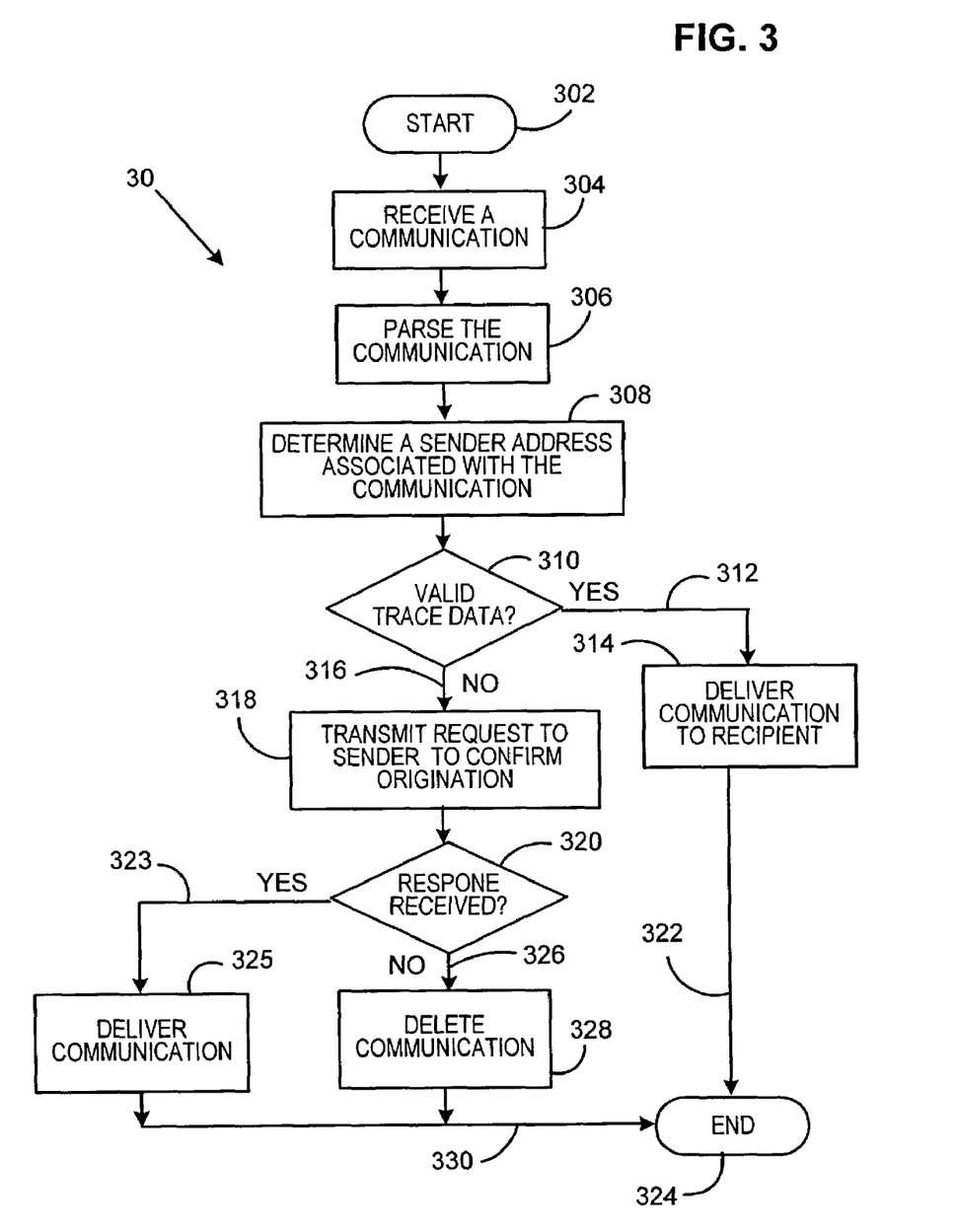
FIG. 3 shows a flowchart of steps to determine the validity of trace data.

Another embodiment of the present invention is illustrated in FIG. 3, which shows a series of steps 30, which may be stored on a computer-readable medium. This method includes, a start block 302, which leads to block 304 in which a communication is received. This communication may be received at a recipient's address, a third party address, or a designated address. Block 306 shows that the communication is parsed to obtain particular information, such as a sender's address, as shown in block 308.

Block 310 shows that a determination is made whether the trace data within the communication is valid. The trace data is validated by confirming the series of transmissions from a sender to a receiver. If a forgery, or gaps in the transmissions, is identified, the trace data is not valid. Line 312 shows that if the trace data is valid the communication is delivered to a recipient electronic address. Line 322 leads to end block 324.

If the trace data is not valid, then line 316 leads to block 318 in which a request is transmitted to the sender electronic address to confirm that the communication originated from the sender electronic address. If a response is received then line 323, from block 320, leads to block 325 that shows the communication is delivered to the recipient. If a response is not received then line 326 leads to block 328 that shows the communication is deleted. Line 330 leads to end block 324.

As described above, the reason for not receiving a response from a sender address may be examined and further action taken in response to the reason. For example, if the sender's memory is full, or the sender is on vacation, the communication may be delivered to the recipient in spite of a non-response to the request.

Another issue related to identifying and preventing transmission of spam is that senders of spam may change the sending email user name by using random characters every time and using a legitimate domain name (e.g. 12345@yahoo.com). Indeed, blocking all yahoo.com email is not an acceptable solution since such an overreaching approach hurts the recipient by impairing significant amount of legitimate communication. Furthermore, such an approach may be of only limited value since blocking 12345@yahoo.com only blocks the message that has already been received since the next one will have a different address. A trusted third party, or another location can automatically forward the message when there is an authenticated return address (the address can be accompanied by a digital certificate or the header information can be traced back to the root system and compared with the sender's reported address).

In order to provide a solution to this particular problem, an embodiment of the present invention is an apparatus and method that determines whether there is a digital certificate associated with the sender's electronic transmission. This is achieved by receiving a communication from a sender electronic address, and parsing the communication. A determination is made whether or not the communication is authenticated by a digital certificate. If a digital certificate is incorporated within the message, or attached to the message then the e-mail client will check the certificate's encrypted data with the identified issuing authority to ensure that the certificate was indeed issued and that the public encryption key can indeed open the certificate. If there is no valid digital certificate, then a message is sent to the sender electronic address that only digitally certified communications are received by the recipient address. If there is a valid digital certificate, then the communication is delivered to the recipient electronic address.

The present invention also addresses the problem of spammers who place enticing, generic ("hey"), or personal subject ("welcome back from vacation") titles on messages that do not relate to the contents of the email. This causes users to open the message believing that the spam sender is responding to the recipient. Also, spammers use legal or financial urgent subject lines to cause users to open the message even though the contents are unrelated. A related problem is that spammers change subjects in messages randomly (or unrelated to the content) to prevent screening of messages by recipients who do not wish to receive spam. Therefore, it is an embodiment of the present invention for an apparatus and method, which is suitably stored on a computer-readable memory for selective delivery of electronic communications. A communication is received from a sender electronic address and the communication is parsed to determine whether a portion of the sender electronic address includes undesired information. This undesired information may include specific terms, such as "pornography", "XXX", "credit" and other terms associated with topics such as pornography, credit cards, and others that are typically transmitted from spammers. In order to validate that a sender who is transmitting communications with undesired terms, a check is performed to authenticate, or validate, the sender. This is achieved by transmitting a request to the sender electronic address to authenticate an origin of the communication. The communication is stored electronically until a response to the request is received from the sender electronic address. If an affirmative response to the request to authenticate is received from the sender electronic address, then the communication is delivered to the recipient electronic address. If the request to authenticate is returned from the sender electronic address as undeliverable, then an indication, or flag, is stored indicating that the sender electronic address is undeliverable. This feature enables a recipient or a third party to flag any number of questionable sender addresses that may be transmitting spam (spamming).

It is also a feature of the present invention that examining a plurality of communications can be examined and a profile of undesired information is established based on portions of the examined communications. Furthermore, the sender's addresses can be added to a database of repeat spammers, which can be forwarded to the appropriate enforcement agency or authority.

Another issue related to spam is that criminals forge web links to cause the user to believe that they are conducting a financial transaction that they are not. For example, a user may receive an email stating that they need to renew or pay for a service, such as their Internet service. The website is a forgery that appears to be legitimate and the unknowing user may input their credit card information social security number and/or other sensitive information.

The present invention provides a solution to such fraud by an apparatus and method for identifying misrepresentations or fraud within an electronic communication. This is accomplished by confirming that the "handoff" from each sender to each recipient is legitimate and there has not been a forgery or misrepresentation regarding the source of the communication. This includes establishing a first portion of the electronic communication, such as hyperlink text data and establishing a second portion of the electronic communication such as hyperlink URL (Uniform Resource Locator) data, text data or sender address data. A comparison is made between the first element or portion of the electronic communication and the second element or portion of the electronic communication. When the first element or portion and the second element or portion do not correspond there is an enhance likelihood that the communication involves a forgery at some point in the transmission history. Under such circumstances, a recipient can request an explanation regarding the disconnect.

Also, an alert condition can result if the portions of the communication do not correspond such that a recipient will receive an indication that something about the communication may not be correct.

It is also an embodiment of the present invention that Internet users who own their own domain, or obtain a secure address service, can create secure tracing addresses by automatically changing their email address every time it is given to a new entity (e.g. registering a new product). For example, a JavaScript timestamp may be appended to the email address (smith2001091801@smith.org) and the recipient information saved as well. Then any mail received by this unique email address would be known to have come through that specific registration even. The source of email spam could be traced. Thus, this invention provides for an apparatus and method for linking a transaction origination address to a reply communication. This is accomplished by allocating a range of electronic addresses to a particular recipient. For example, john.smith@abc.com could be johnl.smith@abc.com for some emails sent and johnm.smith@abc.com for other emails sent.

Thus, a unique recipient electronic address is assigned when the recipient is initiating electronic communication with a sender address. A list of associations between assigned unique recipient electronic addresses and communications is maintained. The assigned unique recipient electronic address is used by the recipient, e.g., John Smith, when transmitting communications. When the recipient receives communications, the return communications will include one of the unique recipient electronic addresses; and the recipient can identify the sender as a function of the unique recipient email address. For example, if the recipient John Smith receives spam to johnl.smith@abc.com, then he knows that was the e-mail that triggered the spam and he can contact the recipient of that e-mail to ascertain why the recipient permitted the spam to occur. Thus, if the recipient is receiving spam, they can identify the source of the spam by correlating the unique recipient email address. At that point, the recipient can notify a third party, such as law enforcement or other enforcement agency of the misrepresentation.

It is also an embodiment of the present invention to provide an apparatus and method for accumulating data relating to unsubscribe requests. This is accomplished by receiving an undesired electronic communication from a sender electronic address at a recipient electronic address. The recipient transmits a first unsubscribe electronic communication to a third party electronic address, such as law enforcement or other agency. A second unsubscribe electronic communication is sent from the third party electronic address to the sender and the third party accumulates unsubscribe data.

While various embodiments of the invention have been described above, it is contemplated that many changes and modifications may be made to the invention without departing from the scope and spirit of the invention as disclosed.

What is claimed is:

1. A method comprising:
   receiving electronically a communication having associated trace data;
   parsing the received communication to determine a sender electronic address associated with the received communication;
   determining if the trace data associated with the received communication is valid;
   transmitting a request to the sender electronic address to authenticate an origin of the received communication in response to a determination that the trace data is not valid;
   storing the communication electronically until a response to the request to authenticate is received from the sender electronic address;
   determining, in response to the request to authenticate being returned from the sender electronic address as undeliverable, a reason that the request to authenticate was undeliverable and delivering the received communication to the recipient electronic address if the reason the request to authenticate was returned as undeliverable indicates that the sender electronic address is associated with a legitimate entity; and
   wherein determining the reason that the request to authenticate was undeliverable includes determining whether the request to authenticate was undeliverable due to an error, lack of disk space, server malfunction, or network malfunction.

2. The method as claimed in claim 1, further comprising:
   evaluating the reason that the request to authenticate was undeliverable; and
   wherein the delivering the received communication to the recipient electronic address is in response to the evaluation.

3. The method as claimed in claim 1, further comprising:
   determining a default time interval, after which an unresponsive request to the sender electronic address to authenticate results in corrective action.

4. The method as claimed in claim 1 further comprising accumulating data relating to sender electronic addresses that are undeliverable.

5. The method as claimed in claim 1, further comprising:
   comparing the sender electronic address to a database; and
   indicating when there is a match between the sender electronic address and a database entry.

6. The method as claimed in claim 1, further comprising sending a notification to the recipient electronic address that the request to authenticate has been returned from the sender electronic address as undeliverable.

7. The method as claimed in claim 6 further comprising:
   receiving, from the recipient electronic address, a request to deliver the received communication or a request to delete the received communication in response to the notification.

8. An article of manufacture including a computer readable medium having instructions stored thereon that, if executed by a computing device, cause the computing device to perform a method comprising:
   determining whether associated trace data and a sender electronic address data associated with a received electronic communication are valid;
   transmitting a request to the sender electronic address to authenticate the origin of the sender electronic address, in response to a determination that the trace data is invalid;
   delivering the received electronic communication to a recipient electronic address in response to a returned request to authenticate that is returned as undeliverable, the returned undeliverable request to authenticate including information that identifies the sender electronic address as a legitimate entity; and determining a reason that the request to authenticate was returned as undeliverable, the reason including at least one of a lack of disk space, a server malfunction, or a network malfunction.

9. The article of claim 8, wherein the instructions, if executed by the computing device, cause the computing device to perform the method further comprising determining if a default time interval has passed after the transmission of the request to authenticate, and in response to the default time interval passing, inquiring if the received communication is to be delivered to the recipient electronic address.

10. The article of claim 8, wherein the instructions, if executed by the computing device, cause the computing device to perform the method further comprising accumulating data relating to sender electronic addresses that are undeliverable.

11. The article of manufacture of claim 8, wherein the instructions if executed by the computing device, cause the computing device to perform the method further comprising:
    comparing the sender electronic address to a database; and
    indicating when there is a match between the sender electronic address and a database entry.

12. The article of manufacture of claim 8, wherein the instructions, if executed by the computing device, cause the computing device to perform the method further comprising:
    sending a notification to the recipient electronic address that the request to authenticate has been returned from the sender electronic address as undeliverable.

13. The article of manufacture of claim 12, wherein the instructions if executed by the computing device, cause the computing device to perform the method further comprising:
    receiving a request to deliver the received communication or a request to delete the received communication in response to the notification.

14. An apparatus comprising:
    a receiver to receive an electronic communication from a sender electronic address, the received electronic communication having associated trace data;
    a processor, coupled to the receiver, configured to determine whether the sender electronic address and the associated trace data are valid, and in response to a determination that the trace data is not valid, generate a request for authentication to authenticate the origin of the received communication; and
    a transmitter to transmit the request for authentication to the sender electronic address, and to deliver the received electronic communication to a recipient electronic address in response to the apparatus receiving a response to the request for authentication, the response indicating the request to authenticate was undeliverable and that the sender electronic address is associated with a legitimate entity; and
    wherein the processor is further configured to determine a reason the response was undeliverable, the reason being one or more of: lack of memory space was available at the sender electronic address, a server malfunction occurred, or a network malfunction occurred.

15. The apparatus of claim 14, further comprising:
    a memory to accumulate data relating to sender electronic addresses that respond to requests to authenticate with a response indicating the request to authenticate was undeliverable.

16. The apparatus of claim 14, wherein the processor is further configured to compare the sender electronic address to a database and facilitate identification when there is a match between the sender electronic address and a database entry.

17. The apparatus of claim 14, wherein the transmitter is further configured to transmit a notification to the recipient electronic address that the request to authenticate has been returned from the sender electronic address as undeliverable.

18. The apparatus of claim 17, where the receiver is further configured to receive a request to deliver the received communication or a request to delete the received communication in response to the notification.

* * * * *

UNITED STATES PATENT AND TRADEMARK OFFICE
CERTIFICATE OF CORRECTION

PATENT NO. : 7,596,600 B2　　　　　　　　　　　　　　　　　　　　　　　　　　Page 1 of 1
APPLICATION NO. : 10/222340
DATED : September 29, 2009
INVENTOR(S) : Quine et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1386 days.

Signed and Sealed this

Twenty-eighth Day of September, 2010

David J. Kappos
*Director of the United States Patent and Trademark Office*